United States Patent
Prakash et al.

(10) Patent No.: US 9,213,359 B2
(45) Date of Patent: Dec. 15, 2015

(54) INTERFACE FOR CONTROLLING THE PHASE ALIGNMENT OF CLOCK SIGNALS FOR A RECIPIENT DEVICE

(71) Applicant: ARM Limited, Cambridge (GB)

(72) Inventors: Gyan Prakash, Bangalore (IN); Nidhir Kumar, Bangalore (IN)

(73) Assignee: ARM Limited, Cambridge (GB)

( * ) Notice: Subject to any disclaimer, the term of this patent is extended or adjusted under 35 U.S.C. 154(b) by 385 days.

(21) Appl. No.: 13/726,383

(22) Filed: Dec. 24, 2012

(65) Prior Publication Data

US 2014/0181568 A1 Jun. 26, 2014

(51) Int. Cl.
*G06F 1/12* (2006.01)
*G06F 1/10* (2006.01)

(52) U.S. Cl.
CPC ... *G06F 1/12* (2013.01); *G06F 1/10* (2013.01)

(58) Field of Classification Search
CPC .......................................................... G06F 1/10
See application file for complete search history.

(56) References Cited

U.S. PATENT DOCUMENTS

| | | | |
|---|---|---|---|
| 7,036,053 B2 | 4/2006 | Zumkehr et al. | |
| 7,111,111 B2 | 9/2006 | Neuman et al. | |
| 7,165,185 B2 | 1/2007 | Li et al. | |
| 7,499,368 B2 | 3/2009 | Rao et al. | |
| 7,886,174 B2 | 2/2011 | Spry et al. | |
| 8,037,375 B2 | 10/2011 | Schaefer | |
| 8,121,237 B2 | 2/2012 | Stott et al. | |
| 8,295,118 B2 | 10/2012 | Best et al. | |
| 2006/0203602 A1 | 9/2006 | Best et al. | |
| 2007/0002642 A1 | 1/2007 | Butt et al. | |
| 2008/0048747 A1* | 2/2008 | Iizuka | 327/261 |
| 2008/0276133 A1 | 11/2008 | Hadley et al. | |
| 2009/0021998 A1 | 1/2009 | Millar et al. | |
| 2009/0109770 A1* | 4/2009 | Sugishita | 365/193 |
| 2010/0246290 A1 | 9/2010 | MacLaren et al. | |
| 2011/0040902 A1 | 2/2011 | Housty | |
| 2011/0078370 A1 | 3/2011 | Chaudhuri et al. | |

(Continued)

OTHER PUBLICATIONS

Notice of Allowance mailed Oct. 8, 2014 in co-pending U.S. Appl. No. 13/726,395.

(Continued)

*Primary Examiner* — Paul Yanchus, III
*Assistant Examiner* — Joshua Neveln
(74) *Attorney, Agent, or Firm* — Pramudji Law Group PLLC; Ari Pramudji

(57) ABSTRACT

Interface circuitry transmitting transactions between an initiator and a recipient includes: a clock input receiving a clock signal; a transaction input receiving transactions; clock outputs for outputting the clock signal; transaction outputs outputting the transactions to the recipient; and synchronizing circuits clocked by the clock signal and transmitting the transactions to the transaction output in response to the clock signal. A controllable delay circuit is provided between the clock input and the synchronizing circuits. A further synchronizing circuit configured to provide a similar delay. Phase detection circuitry is arranged to detect alignment of the received clock signals. Calibration control circuitry adjusts a delay of the controllable delay circuit during calibration until the phase detection circuitry detects alignment. The calibration control circuitry controls the controllable delay circuit to generate a delay to the clock signal in dependence upon the delay that generated the alignment detected during calibration.

20 Claims, 6 Drawing Sheets

(56) References Cited

U.S. PATENT DOCUMENTS

2011/0128793 A1 6/2011 Venkataraman et al.
2011/0158020 A1 6/2011 Hwang

OTHER PUBLICATIONS

Office Action mailed Sep. 16, 2014 in co-pending U.S. Appl. No. 13/854,226.
Notice of Allowance mailed Mar. 11, 2014 in co-pending U.S. Appl. No. 13/726,392.
Office Action mailed Jan. 29, 2015 in co-pending U.S. Appl. No. 13/861,641.
U.S. Appl. No. 13/726,392, filed Dec. 24, 2012, Kumar et al.
U.S. Appl. No. 13/726,395, filed Dec. 24, 2012, Kumar et al.
U.S. Appl. No. 13/854,226, filed Apr. 1, 2013, Prakash et al.
U.S. Appl. No. 13/861,641, filed Apr. 12, 2013, Prakash et al.
"JESD79-3F (Revision of JESD79-3E, Jul. 2010)", DDR3 SDRAM Standard, (Jul. 2012), 226 pages.
P. Fleming et al, "Algorithm for Adjustment of DDR Write Interface Timing" ISSC 2008, Jun. 2008, pp. 144-148.

* cited by examiner

_(1)_

INTERFACE FOR CONTROLLING THE PHASE ALIGNMENT OF CLOCK SIGNALS FOR A RECIPIENT DEVICE

This application incorporates by reference the subject matter disclosed in each of the concurrently filed applications entitled "A Method and Apparatus for Aligning a Clock Signal and a Data Strobe Signal in a memory system" by Nidhar Kumar et al and "A Data Signal Receiver and Method of Calibrating a Data Signal Receiver" by Nidhar Kumar et al."

TECHNICAL FIELD

The technical field relates to the field of interface devices between masters and slaves and in particular to controlling the timings of clock signals used to control the transfer of transactions between the devices.

BACKGROUND

In contemporary systems where transaction are sent from a master, initiator to a slave, recipient at ever increasing speeds, careful control of the clock signals that control the transaction transfer is required to ensure that a transaction sent to a recipient can be correctly received.

For example, in contemporary memory systems, and in particular dual data rate DDR systems which continue to progress to ever higher clock and data transfer rates, it becomes increasingly important that the clock signal clocking the recipient is carefully controlled and aligned with the address, command and control signals controlling the data transfer which control signals may be sent along different paths. The alignment of these signals is important as badly aligned signals cause the incorrect data point to be sampled and errors to occur. For example where the recipient is a DDR DRAM which captures the command address control signals on the rising edge of the input clock, the DRAM has set up and hold timings that need to be met to ensure reliable capture of these inputs. Aligning the clock signal to the centre of the command address control signals allows the set up and hold timings to be accommodated within this cycle.

It is clearly important that such clock signals stay aligned and in some conventional systems the clocking paths are matched to try to ensure that any delays on one path are matched to delays on the other. A disadvantage of this is that additional elements need to be inserted into one of the paths which take area and consume power and can add to clock jitter. Furthermore, in some systems, where one path is significantly longer than another, it may be difficult to closely match the clock paths across PVT as one paths delay may vary differently to the other with changes in operating conditions.

In other systems the recipient itself may send training signals to the master or to an interface between the master and the recipient to try to help align the signals, this requires a particular configuration of the recipient.

It would be desirable to be able to align clock signals accurately and with a low area, power and jitter overhead.

SUMMARY

A first aspect provides interface circuitry for transmitting transactions between an initiator and a recipient, said interface circuitry comprising:
a clock input for receiving a clock signal;
at least one transaction input for receiving transactions;
at least one clock output for outputting said clock signal;

a first clock path for transmitting said clock signal from said clock input to said clock output;
at least one transaction output for outputting said transactions to said recipient;
at least one synchronising circuit clocked by said clock signal configured to transmit said transactions to said at least one transaction output in response to said clock signal;
a second clock path for transmitting said clock signal from said clock input to said at least one synchronising circuit;
a controllable delay circuit arranged on one of said first or second clock path and configured to provide said clock signal with a delay;
a further synchronising circuit configured to provide a similar delay to said at least one synchronising circuit and arranged in parallel with said at least one synchronising circuit such that a clock signal travelling to said further synchronising circuit travels along substantially a same path as a signal travelling to said at least one synchronising circuit;
phase detection circuitry configured to receive a clock signal output by said further synchronising circuit and a clock signal from a location on said first clock path close to said at least one clock output and to detect alignment of said received clock signals; and
calibration control circuitry, said calibration control circuitry being configured to adjust a delay of said controllable delay circuit during calibration until said phase detection circuitry detects said alignment of said clock signals;
said calibration control circuitry being configured to control said controllable delay circuit to generate a delay to said clock signal in dependence upon said delay that generated said alignment detected during calibration during operation of said interface circuitry.

The technology described herein recognises that an interface that transmits a clock signal and transactions to a recipient will need to control the timings of the clock signals that clock the recipient and the transaction output(s) respectively such that they are aligned in a particular manner, so that the recipient can successfully sample the transactions. In many interfaces the transaction output pads may be significantly larger than the clock output pads and be at a significant distance from them. This makes the aligning of the clock signals by accurate matching of the paths to the different output pads difficult. The present technique addresses this issue by instead of placing matching elements on the first path to mirror the elements and delays on the second path it uses a controllable delay circuit on one of the clock paths to adjust the phase of the clock signal on this path and aligns the signals as required.

The transaction output pads are clocked by synchronising circuits close to them and thus, a synchronising circuit that mirrors the synchronising circuits close to the transaction output pads is placed in parallel with these such that a clock signal to this circuit has travelled along substantially the same path and therefore has the same delay as a clock signal to the other synchronising circuits. A phase detector is then used to compare a signal at the output of this synchronising circuit with a clock signal at the clock outputs. In this regard the clock signal at the clock outputs is taken from a location close to a clock output pad. A close location is selected such that the clock signal input to the phase detector sees substantially the same delay as a clock signal that is output at the output pads. Generally, this means that there are no devices between the location that the signal is taken from and the output pad.

An adjustable of controllable delay circuit on one of the clock paths is then used to adjust the phase of the clock signal on one of the paths until the clock signal that clocks the synchronising circuits and the clock signal output at the clock signal output pads are aligned. In this way the signals can be aligned in situ as required. Aligning the signals in this way is accurate and process variation independent. It is also flexible in that the process can be repeated as required and a desired delay that takes into account the difference in the delays of the two paths can be selected.

In some embodiments, said further synchronising circuit is configured to divide a frequency of said input clock by 2.

It is important that the further synchronising circuit mirrors the delay of the synchronising circuits between the second clock path and the transaction output pad, but it can also be advantageous if it divides the frequency of the input clock by two. Where for example a transaction signal is being sampled on a rising or falling edge of a clock signal then it may be desirable for that sampling signal to occur in the centre of the transaction signal. Dividing the clock frequency by two means an alignment can be made where one of the edges is aligned in the centre of this lower frequency signal. Thus, in some embodiments it may be useful if the synchronising circuit also divides the frequency of the input clock by two. Synchronising circuits are well adapted to provide this function.

Although, the synchronising circuit can be a number of things provided that it outputs the transaction signal in response to a clock signal, in some embodiments the synchronising circuits are flip flops. Flip flops provide a reliable, convenient and area efficient way of outputting signals in response to a clock signal.

In some embodiments, said calibration control circuitry is configured during operation of said interface circuitry to control said controllable delay circuit to generate a delay to said clock signal comprising said delay that generated said alignment detected during calibration and a further delay selected to generate a clock signal that is out of phase with said transaction signal by a required amount when output from said interface circuitry.

Phase detection circuitry can detect phase alignment of the clock signals, such that the delay can be varied to generate clock signals in phase alignment. However, it may be desirable in some cases to have clock signals that are not aligned but have a predetermined phase difference to each other, and in such a case an additional delay can be added or subtracted from the delay that generated the alignment, the additional delay being selected to generate signals that are out of phase by the required amount. The delay required to provide such an out of phase signal may be determined during set up for example.

In some embodiments said required amount is 180° out of phase.

As noted previously, in some cases it may be advantageous if the sampling clock signal triggers the sampling in the middle of the transaction output signal. In such a case, it may be desirable to add 180° phase change to the delay that is determined from the phase alignment circuitry that detects alignment of the signals.

In some embodiments, said calibration control circuitry is configured during operation of said interface circuitry to control said controllable delay circuit to generate a delay to said clock signal comprising at least said delay that generated said alignment detected during calibration plus an additional delay, said additional delay being calculated during set up of a particular interface recipient configuration and compensating for differences in delays in connections between said outputs of said interface circuitry and said recipient.

The present technique can align two signals within the interface. However, the adjustable delay control circuitry can be provided with an additional delay as required. It may for example, be advantageous where a particular arrangement is to be used, to determine during set-up the delays that occur when transmitting the signals between the interface and the recipient. Any difference in delays between the two signals can then be adjusted for using the controllable delay circuitry within the interface. In this way the clock signals can be made to accurately have the desired phase difference on arrival at the recipient.

Any difference in delays determined at set up can be used to adjust either the delay that generates signal alignment or the delay that causes the desired phase difference in the signals as required.

In some embodiment, said at least one clock output comprises a differential output and said at least one transaction output comprises a single ended output.

Correcting for the differences in transmission times between the interface and recipient is particularly important where some of the outputs are differential outputs and some are single ended outputs. It may be that the clock output is a differential output as this has advantages in speed when detecting the clock signal edges. Such signals are transmitted faster than the single ended output signals of the transaction and as such, there will be a difference in transmission times between the interface and recipient and being able to correct for this would be advantageous.

In some embodiments, the controllable delay circuit is located on said second clock path and said interface further comprises a first delay circuit arranged on said first clock path and configured to provide said first clock path with a predetermined delay.

It may be advantageous to provide a fixed delay circuit on the path that the controllable delay circuit is not located on. In some embodiments it may be advantageous for the controllable delay circuit to be on the second clock path controlling the delays of the transactions and the fixed delay circuit to be on the first path. This allows a fixed user required delay to be input to the clock signal that is sent to the interface.

In some embodiments, said calibration control circuitry is configured during calibration to initially set a delay of said controllable delay circuit to said delay of said delay circuit in said first path and to adjust said delay during said calibration by reducing said delay until said alignment is reached.

Where a delay circuit is used on the first clock path then when calibrating the delay circuit on the second clock path, the delay on the second clock path can initially be set to the delay of the delay circuit on the first clock path and this can then be adjusted by reducing the delay until alignment is reached. The delay on the second clock path will be longer than the delay on the first clock path as the transaction outputs are generally further away from the clock input and are large and have more intermediate devices. Thus, it is known that the delay will be greater on this path and therefore starting with the initial delay of the first clock path and reducing the delay is an effective way of reaching a calibration point fairly quickly.

In some embodiments, said calibration control circuitry is configured to periodically perform calibration and detect a new delay that provides said alignment and to update said delay provided by said controllable delay circuit in dependence upon said detected new delay.

As the calibration control is performed within the interface using devices present within the interface, it is possible to perform it periodically and update the delay as conditions vary and therefore process variations occur. This allows the signals to stay very closely aligned and is a further advantage of the system.

Although the present technique is applicable to any initiator device sending transactions to a recipient it is particularly suitable for cases where the recipient is a memory and the transaction is a data access request. Data access requests to memory are being performed ever more quickly and as such the alignment of the clock signals is becoming more difficult and more important.

In some embodiments, said transactions comprise double data rate data accesses and said recipient is a dynamic random access memory DRAM.

In particular, in double data rate data accesses where the recipient is a dynamic random access memory and the transaction signal sending the address is sampled on the rising clock edge it is important that the clock signal is closely aligned to the centre of the transaction signal if one wishes the data to be sampled correctly. In other cases the transaction signal may be sampled on the rising and falling clock edges and again accurate alignment is important. This technique allows such close alignment to occur reliably.

The second aspect of the present invention provides a method of aligning clocks signals within interface circuitry for transmitting transactions from an initiator to a recipient, said interface circuitry comprising:

receiving a clock signal;

transmitting said clock signal to at least one clock output via a first path;

transmitting said clock signal via a second path to at least one synchronising circuit for transmitting transactions to at least one transaction output in response to said clock signal and to a further synchronising circuit configured to have a similar delay to said at least one synchronising circuit;

delaying said clock signal by a controllable delay circuit on one of said first or second paths;

calibrating said controllable delay circuit by adjusting a delay of said controllable delay circuit and detecting a phase difference between a clock signal output by said further synchronising circuit and a clock signal from a location close to said at least one clock output, until alignment of said two clock signals is detected; and setting a delay of said controllable delay circuit to a value dependent upon said delay that caused said alignment detected during said calibrating step.

A third aspect of the present invention provides interface means for transmitting transactions between an initiating means and a receiving means, said interface means comprising:

a clock input means for receiving a clock signal;

at least one transaction input means for receiving transactions;

at least one clock output means for outputting said clock signal;

a first clock path for transmitting said clock signal from said clock input to said clock output;

at least one transaction output means for outputting said transactions to said recipient;

at least one synchronising means clocked by said clock signal for transmitting said transactions to said at least one transaction output in response to said clock signal;

a second clock path for transmitting said clock signal from said clock input to said at least one synchronising circuit;

a controllable delay means arranged on one of said first or said second clock paths for providing said clock signal with a delay;

a further synchronising means for providing a similar delay to said at least one synchronising means and arranged in parallel with said at least one synchronising means on said second clock path;

phase detection means for receiving a clock signal output by said further synchronising means and a clock signal from said first clock path close to said at least one clock output and for detecting alignment of said received clock signals; and calibration control means for adjusting a delay of said controllable delay circuit during calibration until said phase detection means detects said alignment of said clock signals;

said calibration control mean being for controlling said controllable delay circuit to generate a delay to said clock signal in dependence upon said delay that generated said alignment detected during calibration during operation of said interface means.

The above, and other objects, features and advantages of this invention will be apparent from the following detailed description of illustrative embodiments which is to be read in connection with the accompanying drawings.

DESCRIPTION OF THE EXAMPLE NON-LIMITING EMBODIMENTS

Figure 1:
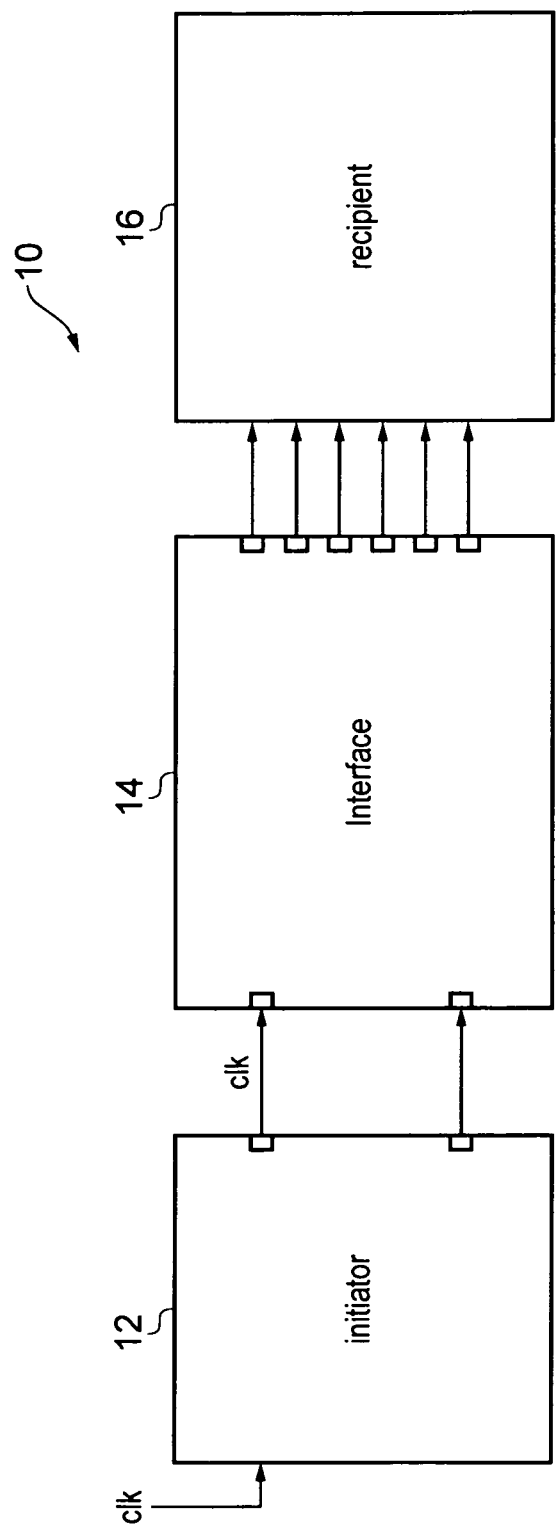
FIG. 1 shows an initiator interface and recipient according to an embodiment.

FIG. 1 shows a data processing system 10 having an initiator 12, an interface 14 according to an embodiment of the present invention and a recipient 16. The initiator may be any device that generates transactions for a recipient thus it may be a DMA direct memory access unit sending transactions to a recipient that is a memory or it may be a processor sending transactions to a cache or it may be a graphics processor unit GPU sending transactions to some store. Alternatively, it could be a processor sending instructions to a GPU.

The interface of the present technique is applicable to any system where transactions are sent to a recipient and it is important that the clock signal sent for clocking the recipient is aligned with the signal synchronising the output of the transactions such that the recipient can sample them successfully. Although in this Figure the interface is shown as a separate block of circuitry it should be understood that it may be located on the initiator or on the recipient. Furthermore, although the clock signal input to the interface is shown as coming from the initiator it may come from a different clock source.

As clocking speeds increase, the alignment of these signals becomes ever more important as badly aligned signals cause the incorrect data point to be sampled and errors to occur.

Figure 2:
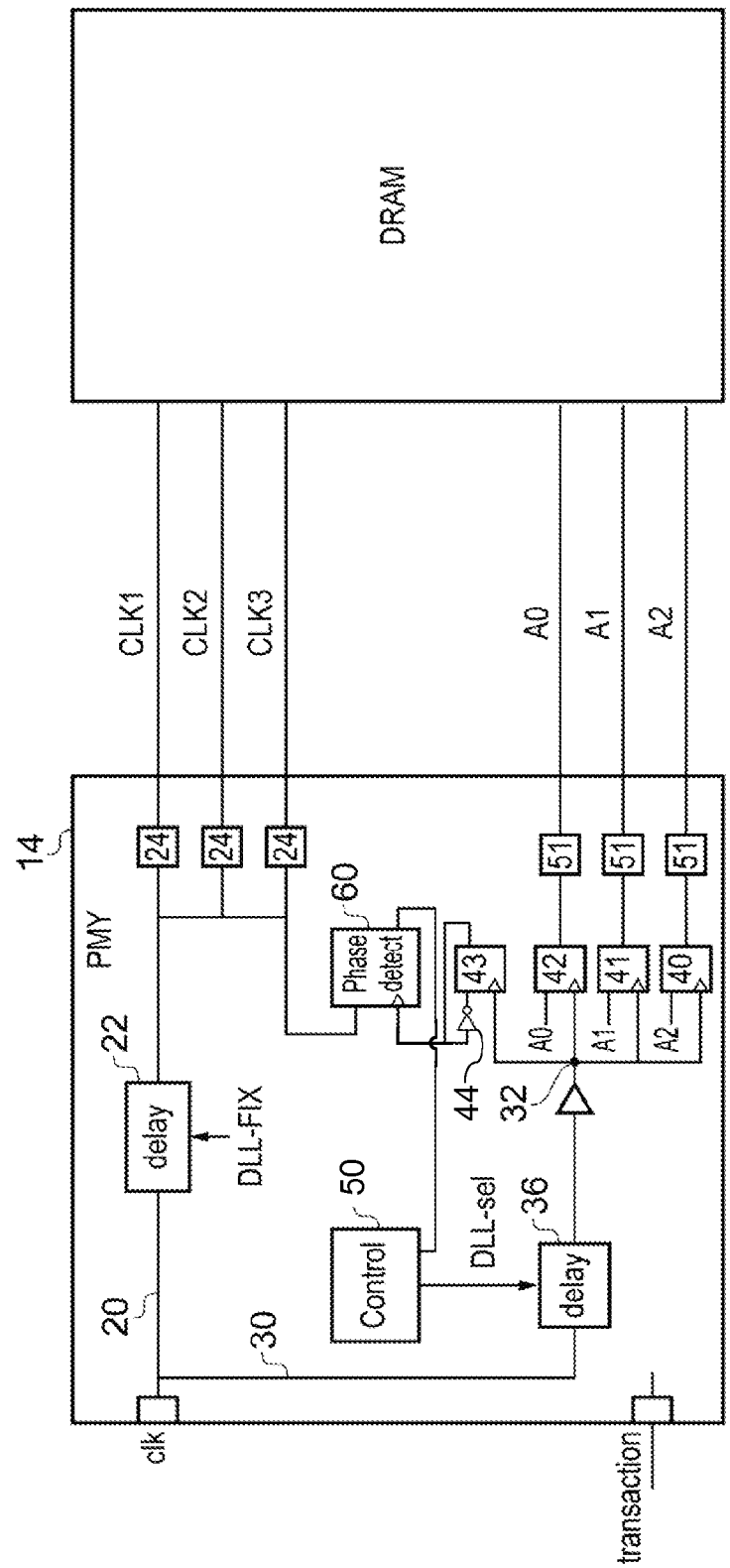
FIG. 2 schematically shows an interface and a DRAM according to an embodiment of the present invention.

FIG. 2 shows the interface 14 in greater detail. In this case it is an interface that is sending data access requests to a DRAM. The DRAM is a DRAM which captures signals on the rising edge of the clock signal, in other embodiments data may be captured on both the rising and falling edges of the clock signal. The transaction requests are received at the interface 14 and the addresses for the data access requests are output at A0, A1 and A2. In order to achieve reliable operation it is desirable if the address signals that are output are aligned with the clock signal clocking the recipient in such a way that the centre of the cycle outputting the addresses is aligned with the rising edge of the clock signals clk1, clk2, clk3 output at clock output pads 24 and clocking the DRAM.

Interface or PHY (physical layer) 14 receives a clock signal CLK which it transfers along a first path 20 via delay element 22 to a plurality of clock output pads 24. This clock signal is the signal that clocks the DRAM. As can be seen this path is a relatively short path. The delay element 22 adds a fixed delay to the path, this delay is set by the value of DLL_fix.

There is a second clock path 30 that runs from the clock input to point 32 close to the input of synchronising elements 40, 41, 42 and 43. There is a controllable delay element 36 on this path and it is controlled by a signal DLL_SEL sent by control circuitry 40.

The clock signal sent along the second clock signal path 30 clocks the synchronising elements 40, 41 and 42 which control the timing of the output of the address signals at output pads 51.

There is a further synchronising element 43 which is arranged to mirror synchronising elements 40, 41 and 42 and is located in parallel with them. It has an inverter 44 arranged on a feedback loop to the data input and this provides a divide by two function for the clock signal. This clock signal is input to phase detector 60 along with the clock signal from a location close to the clock output pads 24 and the output of this phase detection signal is sent to control circuitry 40.

During calibration of the system the signal DLL_SEL is set to the same value as the delay signal DLL_fix for the delay element 22 on the first clock path 20. The control circuitry 40 then gradually reduces the delay signal DLL_SEL and monitors the output from the phase detector 60. When this output indicates that the clock signals from close to the clock output pads 24 and from the synchronising element 43 are aligned then the DLL_SEL that caused this delay is selected as the calibrated control signal for the delay element 36, this delay causes alignment of the clock signals on the first path 20 and the second path 30.

The delay element 36 is then provided with this control value during operation if aligned clock signals are required. Alternatively, if clock signals that are 180° out phase are required, then the DLL_SEL value that provided alignment with an additional 180° phase delay is selected. This is the case in this example as the recipient device is a double data rate DRAM and the address signal should be out of phase with the clock signal. This is described in more detail with respect to FIGS. 3 and 4. There may be additional adjustments made to the DLL_SEL value to compensate for various known delays of the system and this will be described in more detail later.

Figure 3:
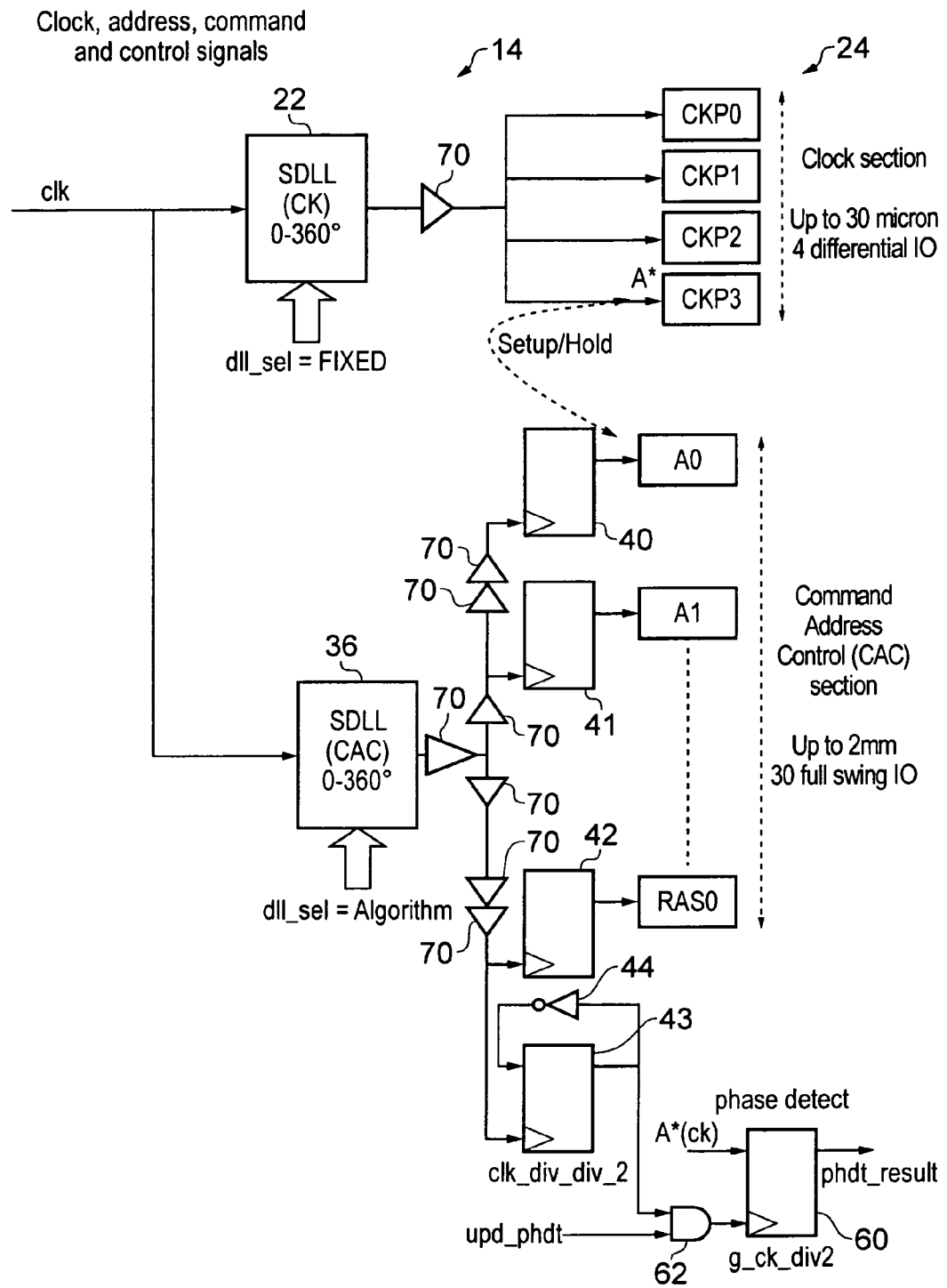
FIG. 3 schematically shows the circuitry within an interface according to an embodiment of the present invention.

FIG. 3 shows the circuitry within interface 14 in more detail. In this embodiment there is a clock input that sends a clock signal CLK to the first delay circuitry 22 which is in the form of a slave delay lock loop DLL. A fixed control signal is sent to this circuitry which provides a fixed delay. There may then be one or more buffer circuits 70 between this delay circuit and the clock output section 24. The clock output section has a plurality of pads that output clock signals for the recipient. As the paths are not matched by matching devices there is no need to place many buffers on this first clock path and thus, it is very area efficient. It should be noted that the clock output section size is about 30 microns and has four differential output pads. Differential output pads work on a differential signal such that the swing is twice that of a single ended signal and the detection of a sampling point can be made more quickly.

Point A* is a point close to one of the output pads and it is from here that the clock signal is taken to the phase detector 60.

Controllable slave delay lock loop 36 lies on the path to the command outputs that output the addresses for the data accesses and has a control signal DLL_SEL which is set by an algorithm within control circuitry not shown. There are then some buffers 70 that lead to the synchronising elements 40, 41 and 42, which are connected to the output command address pads A0, A1 . . . RAS0. Only three are shown but it would be clear that there may be many more, 32 for example would not be unusual. This is the command address control section and may be up to 2 mm wide. These outputs are single ended outputs.

There is then synchronising element 43 which matches the synchronising elements 40, 41 and 42 at the command output pads and has a divide by two function which is implemented by inverter 44 on a feedback loop. Phase detector 60 has two signal inputs one coming from the output of the synchronising element 43 and one coming from close to the output pad at point A*. These two signals are clock signals and phase detector 60 compares them. In this embodiment there is also an AND gate 62 which is located on the input to phase detector 60 which receives the output signal from synchronising element 43. The AND gate 62 ANDs this output signal with a phase detect signal upd_phdt and in this way acts to only input the output from the synchronising element to the phase detector 60 when the phase detect signal upd_phdt is high. In this way the phase detect signal determines when the phase detection is performed. The result of the phase detection phdt_result is input to the control circuitry which controls the algorithm which sets the delay of the delay locked loop 36.

In this way phase detection circuitry 60 performs phase detection on the two clock signals in dependence upon a phase detect signal upd_phdt and determines when the signals are aligned.

Figure 4A:
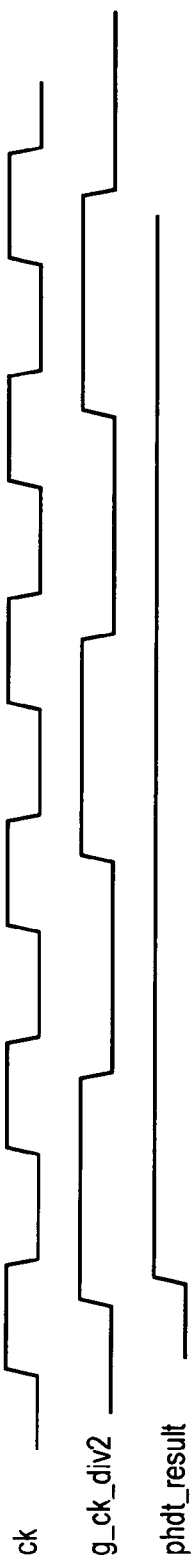
FIGS. 4a, 4b and 4c show timing diagrams of signals of the circuitry of FIG. 3.
Figure 4B:
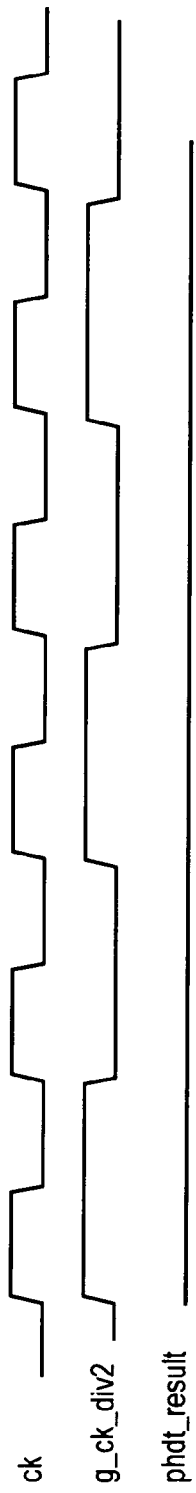
Figure 4C:
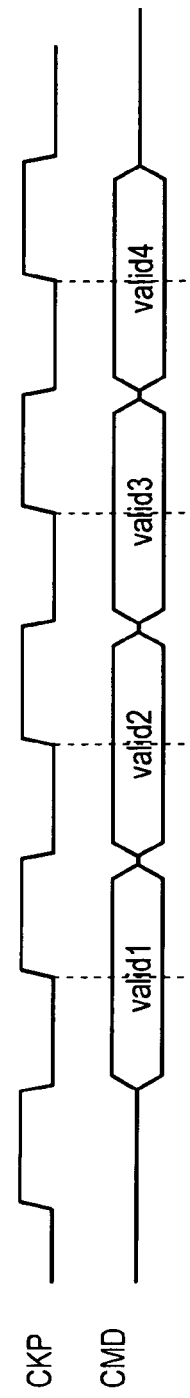

FIGS. 4a, 4b and 4c show a timing diagram illustrating the clocking signals and the steps in the phase alignment of these signals for this circuit.

The signals shown are the clock signal of the first clock path at the clock pads ck, the clock signal g_ck_div2 that is the clock signal of the second clock path that has been divided by 2 by the synchronising element 43 and has been ANDed with the phase detect signal upd_phdt and the output of the phase detector 60 phdt_result, the phase detector 60 comparing the clock signal ck of the first clock path with the signal g_ck_div2 of the second clock path.

FIG. 4a shows an initial step in the calibration.

Initially the delay of both of the delay lock loops 22 and 36 are set to a user required default delay and as the clock tree latency for the second path is longer, the delay of the clock signal on the second clock path that has been divided by 2 that is g_ck_div2 is longer than the delay of the clock signal ck on the first clock path. At this point the result from the phase detector 60 is a 1 showing that they are out of phase with each other. In response to the output from the phase detector being a 1, the control circuitry continues to reduce the input to the controllable delay circuitry 36 such that the delay on this path is reduced and at the same time monitors the output from the phase detector 60.

FIG. 4b shows the signals some time later where the delay of the controllable delay circuit 36 has been decreased such that the rising edge of the two signals are aligned and the output of the phase detector phdt_result goes low. At this point and in response to the phdt_result going to 0 it is determined that the signals are phase aligned.

In this case as we want the signals to be 180° out of phase the signal DLL_sel that controls the delay of the controllable delay circuit 36 is set to the value that caused the alignment plus a value that provides an additional 180° delay plus or minus any pre-programmed software correction that was determined during testing at set-up of the particular system to compensate for any PCB delays between the interface and the recipient due to the clock pads being differential and the command address control pads being full swing. These values are loaded into the delay control circuitry 36 to centre align the commands on the command address pads to the clock signal as shown in FIG. 4C.

This centre alignment is required as in this example the recipient is a DDR DRAM which captures the command address control signals on the rising edge of the input clock. The DRAM has set up and hold timings that need to be met to ensure reliable capture of these inputs. Aligning the clock signal to the centre of the command address control signals allows the set up and hold timings to be accommodated within this cycle.

As can be seen from FIG. 3 the width of address command and control section can be significantly larger than the width of the clock section due to there being significantly more output pads. This requires a dedicated clock network to be built for the command address control section as is shown in FIG. 3. To satisfy the setup timings and the hold timings it would be required to match the clock latency on the clock output pads. The true matching of this tree using matching devices would be very difficult because of different path elements, component mismatch and on chip variations. Thus, to address this problem slave delay lock loops are used in the clock paths and a divide by two clock is generated to account for the clock to output delays of the synchronising elements at the output of the command address control section. This divide by two clock is used as a feed to the phase detection flop 60 whose data input is the clock signal at the clock section pads. In this way the slave delay lock loops are calibrated during system initialisation to cancel out on-chip skew, on-chip variations and to place the command address control signal in the middle of the clock signal. The calibration is performed at system initialisation and can be performed again at various points during operations to maintain alignment.

Figure 5:
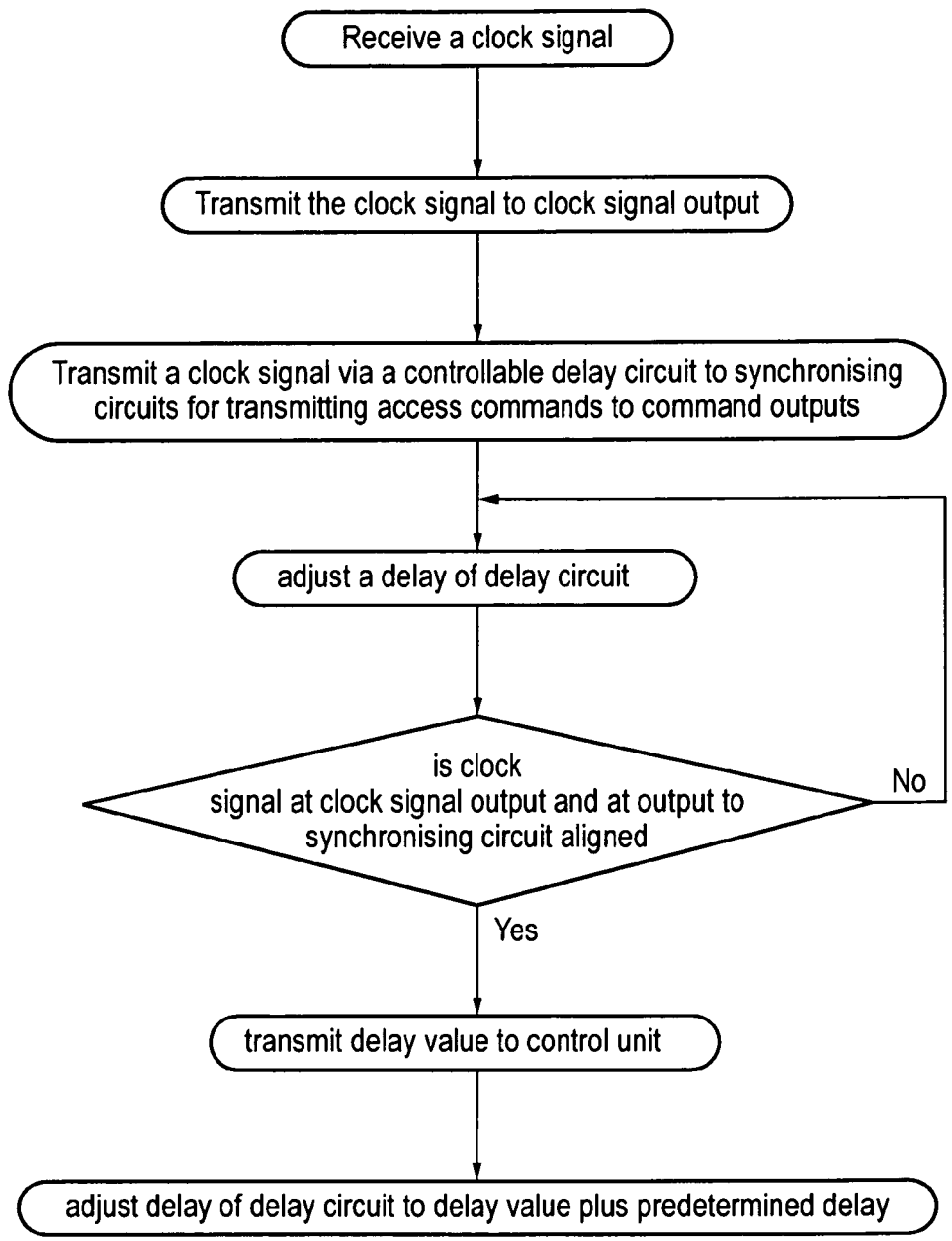
FIG. 5 shows a flow diagram illustrating steps in a method according to a present invention.

FIG. 5 shows a flow diagram illustrating steps in a method according to the present technique. Initially, a clock signal is received and the clock signal is transmitted to the clock signal output. The clock signal is also transmitted with a controllable delay signal to synchronising circuits which are used for transmitting transactions to the output. It should be noted that although in this example the controllable delay circuit is on the path to the synchronising circuits it could be on the other clock path as it is the relative phase of the two signals that is measured and thus, controlling the delay on either one can bring them into the required alignment.

During calibration a delay of the delay circuit is adjusted and it is determined if the clock signal at the clock signal output and at the output to the synchronising circuits are aligned. If they are not the delay of the delay circuit is adjusted until they are. In the example where the controllable delay circuit is on the longer second path then the delay is generally decremented until alignment is reached, where however, it is on the shorter first path then it will be incremented until alignment is detected.

The delay value that caused this alignment is then transmitted to a control unit and the delay of the delay circuit is adjusted to a value based on this delay during operation. In this regard it may be desired to use the actual delay that caused alignment where aligned signals are required, or it may be desired to have different phase delay, for example a 180° phase difference between the signals may be desirable, in which case, the alignment delay is varied by the required amount to provide the desired phase change.

In some embodiments additional delays present between the interface and recipient may be known from calibration measurements at set up for example. In such a case there can be added to the phase delay such that these differences can be compensated for and the signals on arrival at the recipient are in the required alignment.

Figure 6:
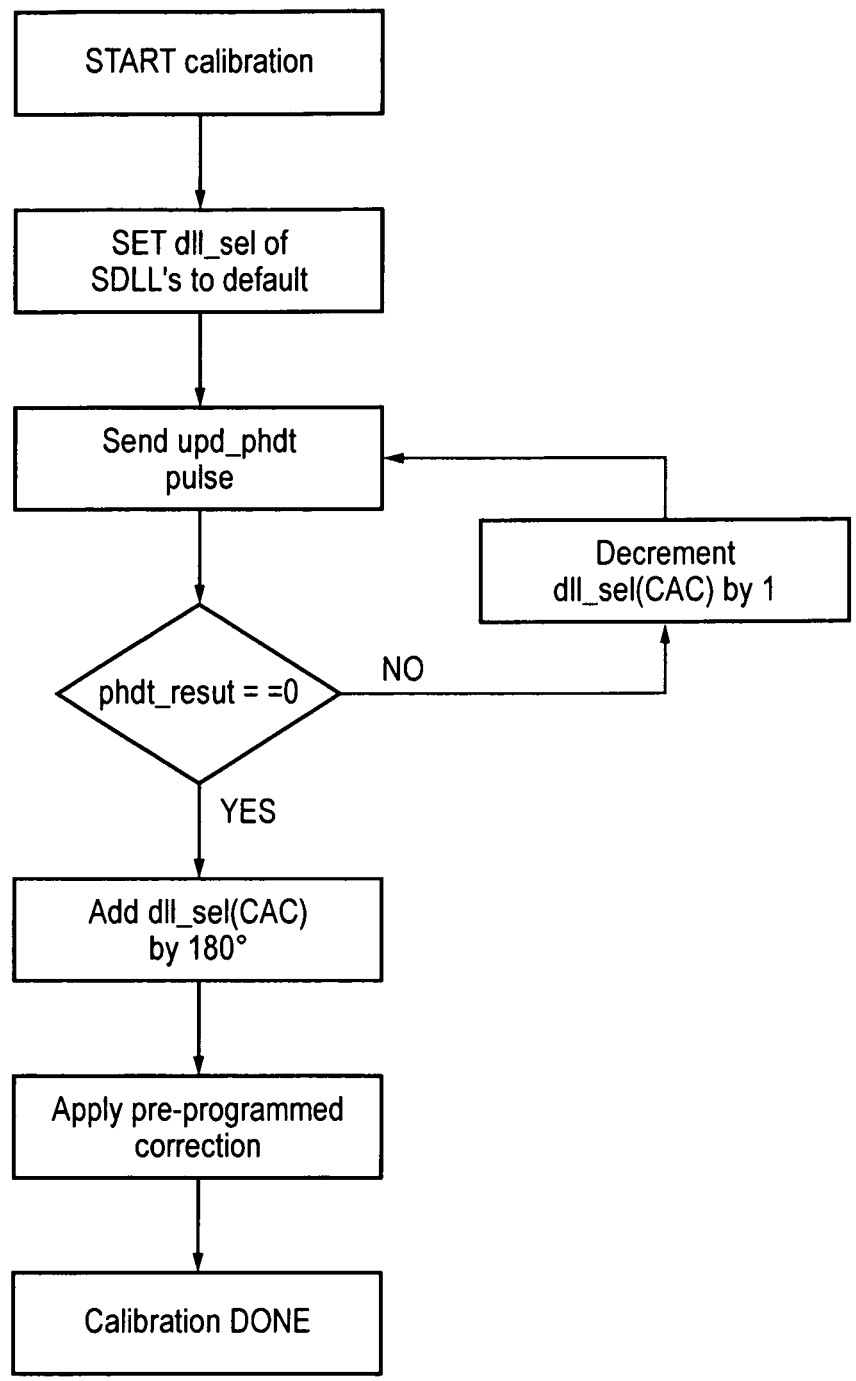
FIG. 6 shows a further flow diagram illustrating such steps.

FIG. 6 shows a further flow diagram illustrating the steps performed during calibration. This diagram illustrates how the signals shown in FIGS. 3 and 4 change during the calibration method. Thus, initially calibration is started and the delay signal dll_sel for both delay circuits 22 and 36 is set to the default value of the slave delay lock loops. There is then an update phase detection signal sent to the phase detector 60 indicating that it should check if the signals are aligned. If the result is not equivalent to zero which indicates alignment then the control signal sent to the adjustable delay circuit 36 is decremented and the steps are repeated until the phase detector produces a result of zero.

When the phase detection signal is equal to zero then the control signal sent to the adjustable control circuitry 36 is set to this value plus a delay value to give 180° phase delay. A pre-programmed correction to allow for a particular set up and delays in sending the signals to the recipient is then applied whereupon the calibration is complete.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. Interface circuitry for transmitting transactions between an initiator and a recipient, said interface circuitry comprising:
   a clock input for receiving a clock signal;
   at least one transaction input for receiving transactions;
   at least one clock output for outputting said clock signal;
   a first clock path for transmitting said clock signal from said clock input to said clock output;
   at least one transaction output for outputting said transactions to said recipient;
   at least one synchronising circuit clocked by said clock signal configured to transmit said transactions to said at least one transaction output in response to said clock signal;
   a second clock path for transmitting said clock signal from said clock input to said at least one synchronising circuit;
   a controllable delay circuit arranged on one of said first or said second clock paths and configured to provide said clock signal with a delay;
   a further synchronising circuit configured to provide a similar delay as said at least one synchronising circuit and arranged in parallel with said at least one synchronising circuit such that a clock signal travelling to said further synchronising circuit travels along substantially a same path as a signal travelling to said at least one synchronising circuit;
   phase detection circuitry configured to receive a clock signal output by said further synchronising circuit and a clock signal from a location on said first clock path close to said at least one clock output and to detect alignment of said received clock signals; and calibration control circuitry configured to adjust a delay of said controllable delay circuit during calibration until said phase detection circuitry detects said alignment of said clock signals;

said calibration control circuitry being configured to control said controllable delay circuit to generate a delay to said clock signal in dependence upon said delay that generated said alignment detected during calibration during operation of said interface circuitry.

2. Interface circuitry according to claim 1, wherein said further synchronising circuit is configured to divide a frequency of said input clock by 2.

3. Interface circuitry according to claim 1, wherein said at least one synchronising circuit is a flip flop.

4. Interface circuitry according to claim 1, wherein said calibration control circuitry is configured during operation of said interface circuitry to control said controllable delay circuit to generate a delay to said clock signal comprising said delay that generated said alignment detected during calibration and a further delay selected to generate a clock signal that is out of phase with said transaction signal by a required amount when output from said interface circuitry.

5. Interface circuitry according to claim 4, wherein said required amount is 180° out of phase.

6. Interface circuitry according to claim 4, wherein said transactions comprise double data rate data accesses and said recipient is a dynamic random access memory DRAM that captures data on a rising edge of a clock signal.

7. Interface circuitry according to claim 1, wherein said calibration control circuitry is configured during operation of said interface circuitry to control said controllable delay circuit to generate a delay to said clock signal comprising at least said delay that generated said alignment detected during calibration plus an additional delay, said additional delay being calculated during set up of a particular interface recipient configuration and compensating for differences in delays in connections between said outputs of said interface circuitry and said recipient.

8. Interface circuitry according to claim 7, wherein said at least one clock output comprises a differential output and said at least one transaction output comprises a single ended output.

9. Interface circuitry according to claim 1, wherein said controllable delay circuit is located on said second clock path and said interface further comprises a first delay circuit arranged on said first clock path and configured to provide said first clock path with a predetermined delay.

10. Interface circuitry according to claim 9, wherein said calibration control circuitry is configured during calibration to initially set a delay of said controllable delay circuit to said delay of said first delay circuit path and to adjust said delay during said calibration by reducing said delay until said alignment is reached.

11. Interface circuitry according to claim 1, wherein said calibration control circuitry is configured to periodically perform calibration and detect a new delay that provides said alignment and to update said delay provided by said controllable delay circuit in dependence upon said detected new delay.

12. Interface circuitry according to claim 1, wherein said recipient is a memory and said transactions comprise data access requests.

13. Interface circuitry according to claim 1, wherein said controllable delay circuitry comprises a delay locked loop.

14. A method of aligning clock signals within interface circuitry for transmitting transactions from an initiator to a recipient, said interface circuitry comprising:

receiving a clock signal;

transmitting said clock signal to at least one clock output via a first path;

transmitting said clock signal via a second path to at least one synchronising circuit for transmitting transactions to at least one transaction output in response to said clock signal and to a further synchronising circuit configured to have a similar delay as said at least one synchronising circuit;

delaying said clock signal by a controllable delay circuit on one of said first or second paths;

calibrating said controllable delay circuit by adjusting a delay of said controllable delay circuit and detecting a phase difference between a clock signal output by said further synchronising circuit and a clock signal from a location close to said at least one clock output, until alignment of said two clock signals is detected; and setting a delay of said controllable delay circuit to a value dependent upon said delay that caused said alignment detected during said calibrating step.

15. A method according to claim 14, wherein said further synchronising circuit is configured to divide a frequency of said clock signal by 2.

16. A method according to claim 14, wherein said step of setting said delay comprises adding a required phase delay to said delay that generated said alignment detected during calibration, such that said clock signal is said required phase delay out of phase with said transaction signal when output from said interface circuitry.

17. A method according to claim 14, comprising an initial step of determining delays in transmitting clock signals and data signals from said interface circuitry to said recipient for a particular interface recipient configuration; wherein said step of setting said delay comprises adding an additional delay, said additional delay being determined in said determining step and compensating for differences in delays in transmitting said clock signals and said data signals to said recipient to said delay that generated said alignment detected during said calibrating step.

18. A method according to claim 14, wherein said controllable delay circuit is located on said second path; and said step of transmitting said clock signal to said at least one clock output comprises transmitting said clock signal through a first delay circuit on said first path; and said calibrating step comprises initially setting a delay of said controllable delay circuit to said delay of said first path and adjusting said delay during said calibration by reducing said delay until said alignment is reached.

19. A method according to claim 14, comprising performing said calibrating and setting steps periodically.

20. An interface for transmitting transactions between an initiator and a recipient, the interface comprising:

a clock input for receiving a clock signal;

at least one transaction input for receiving transactions;

at least one clock output for outputting said clock signal;

a first clock path for transmitting said clock signal from said clock input to said clock output;

at least one transaction output for outputting said transactions to said recipient;

at least one synchronising circuit clocked by said clock signal for transmitting said transactions to said at least one transaction output in response to said clock signal;

a second clock path for transmitting said clock signal from said clock input to said at least one synchronising circuit;
a controllable delay arranged on one of said first or said second clock paths for providing said clock signal with a delay;
a further synchronising circuit for providing a similar delay as said at least one synchronising circuit and arranged in parallel with said at least one synchronising circuit means on said second clock path;
phase detector for receiving a clock signal output by said further synchronising circuit means and a clock signal from said first clock path close to said at least one clock output and for detecting alignment of said received clock signals; and
calibration control for adjusting a delay of said controllable delay during calibration until said phase detection detects said alignment of said clock signals;
said calibration control being for controlling said controllable delay circuit to generate a delay to said clock signal in dependence upon said delay that generated said alignment detected during calibration during operation of said interface.

* * * * *